United States Patent
Kang

(10) Patent No.: US 9,377,887 B2
(45) Date of Patent: Jun. 28, 2016

(54) MANUFACTURING METHOD OF FLEXIBLE DISPLAY DEVICE AND MANUFACTURING METHOD OF TOUCH SCREEN PANEL

(71) Applicant: Samsung Display Co., Ltd., Yongin-si (KR)

(72) Inventor: Sung-Ku Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/957,000

(22) Filed: Dec. 2, 2015

(65) Prior Publication Data

US 2016/0085352 A1    Mar. 24, 2016

Related U.S. Application Data

(62) Division of application No. 14/471,452, filed on Aug. 28, 2014, now Pat. No. 9,229,566.

(30) Foreign Application Priority Data

Sep. 5, 2013  (KR) .......................... 10-2013-0106408

(51) Int. Cl.
| | |
|---|---|
| *H01L 31/02* | (2006.01) |
| *G06F 3/041* | (2006.01) |
| *G06F 3/044* | (2006.01) |
| *G09G 3/32* | (2016.01) |

(52) U.S. Cl.
CPC .............. *G06F 3/0412* (2013.01); *G06F 3/044* (2013.01); *G09G 3/3208* (2013.01); *G06F 2203/04102* (2013.01); *G06F 2203/04103* (2013.01); *G06F 2203/04111* (2013.01)

(58) Field of Classification Search
CPC ... H01L 21/00; H01L 31/0352; H01L 31/182; H01L 31/0742; H01L 31/02363
USPC .......................................... 257/431, E31.032
See application file for complete search history.

(56) References Cited

U.S. PATENT DOCUMENTS

| | | | |
|---|---|---|---|
| 9,229,566 B2 * | 1/2016 | Kang | ................... G06F 3/0412 |
| 2012/0055997 A1 | 3/2012 | De Ridder | |
| 2012/0075207 A1 | 3/2012 | Jang | |
| 2012/0326255 A1 | 12/2012 | Kobayashi | |
| 2014/0145977 A1 | 5/2014 | Kang | |
| 2014/0162522 A1 | 6/2014 | Zhou | |
| 2014/0218630 A1 | 8/2014 | Kang | |

FOREIGN PATENT DOCUMENTS

| | | |
|---|---|---|
| KR | 10-2012-0032735 | 4/2012 |
| KR | 10-2014-0066441 | 6/2014 |
| KR | 10-2014-0100090 | 8/2014 |

OTHER PUBLICATIONS

Notice of Allowance issued on Sep. 30, 2015, in U.S. Appl. No. 14/471,452.

* cited by examiner

*Primary Examiner* — Michael Lebentritt
(74) *Attorney, Agent, or Firm* — H.C. Park & Associates, PLC

(57) ABSTRACT

Provided is a method of manufacturing a flexible display device, comprising: forming a concavo-convex area comprising a first concavo-convex pattern on one surface of a carrier substrate; forming a flexible substrate on the one surface of the carrier substrate; forming a display element configured to display an image on the flexible substrate; and separating the flexible substrate from the carrier substrate.

18 Claims, 4 Drawing Sheets

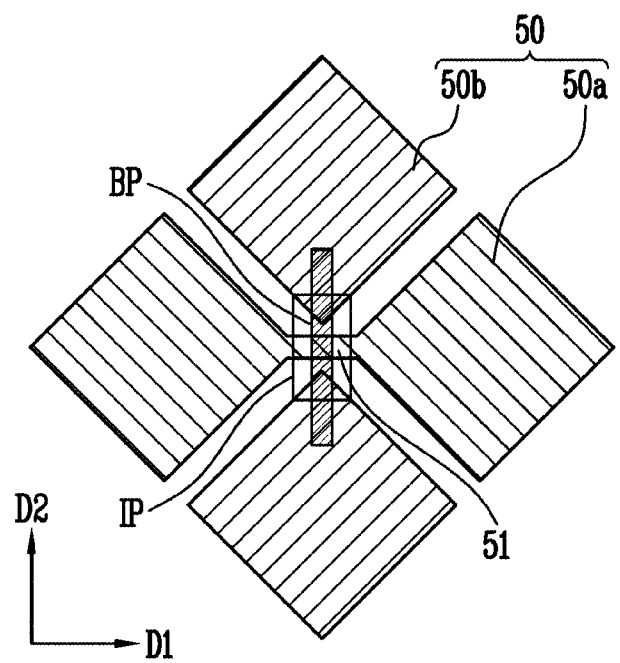

MANUFACTURING METHOD OF FLEXIBLE DISPLAY DEVICE AND MANUFACTURING METHOD OF TOUCH SCREEN PANEL

CROSS REFERENCE TO RELATED APPLICATION

This application is a divisional of U.S. patent application Ser. No. 14/471,452, filed on Aug. 28, 2014, and claims priority from and the benefit of Korean Patent Application No. 10-2013-0106408, filed on Sep. 5, 2013, both of which are hereby incorporated by reference for all purposes as if fully set forth herein.

BACKGROUND

1. Field

Exemplary embodiments of the present invention relate to a flexible display device, a touch screen panel, and a manufacturing method thereof.

2. Discussion of the Background

Recently, demand for flexible display devices made foldable or bendable has been increasing. A flexible display device can be made to maintain a display of images while being bent like paper, by using materials such as flexible plastics rather than a conventional glass substrate that lacks flexibility.

Meanwhile, among display devices, an organic light emitting display (OLED) device has various advantages such as light weight, slim structure, and compactness. Hence, an OLED device is frequently employed as a display panel of a flexible display device. In some products, a touch screen panel can be attached to the display device. In this case, the touch screen panel attached to the display device having flexibility should also have flexibility.

SUMMARY

According to one exemplary embodiment of the present invention, there is provided a method of manufacturing a flexible display device, comprising: forming a concavo-convex area comprising a first concavo-convex pattern on one surface of a carrier substrate; forming a flexible substrate on the one surface of the carrier substrate; forming a display element configured to display an image on the flexible substrate; and separating the flexible substrate from the carrier substrate.

According to one exemplary embodiment, there is provided a method of manufacturing a touch screen panel, comprising: forming a concavo-convex area comprising a first concavo-convex pattern on one surface of a carrier substrate; forming a flexible substrate on the one surface of the carrier substrate; forming sensing electrodes configured to sense touch on the flexible substrate; and separating the flexible substrate from the carrier substrate.

It is to be understood that both the foregoing general description and the following detailed description are exemplary and explanatory and are intended to provide further explanation of the invention as claimed.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a partially enlarged view illustrating sensing electrodes of FIG. 3C.

DETAILED DESCRIPTION

Figure 1A:
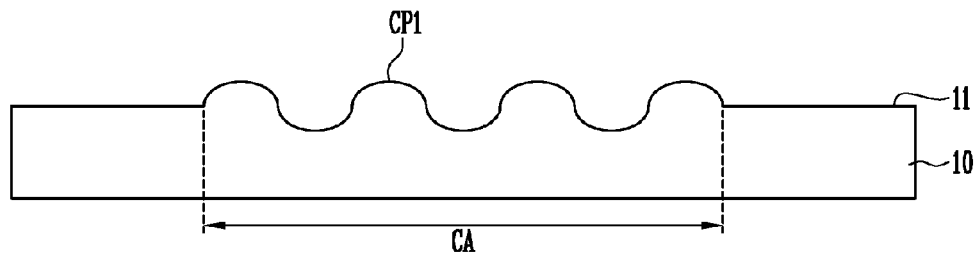
FIGS. 1A, 1B, 1C, and 1D are cross-sectional views illustrating a manufacturing method of a flexible display device according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIGS. 1A to 1D are cross-sectional views illustrating a manufacturing method of a flexible display device according to one exemplary embodiment of the present invention. FIG. 2 is a view illustrating a folding axis of the flexible display device.

Figure 2:
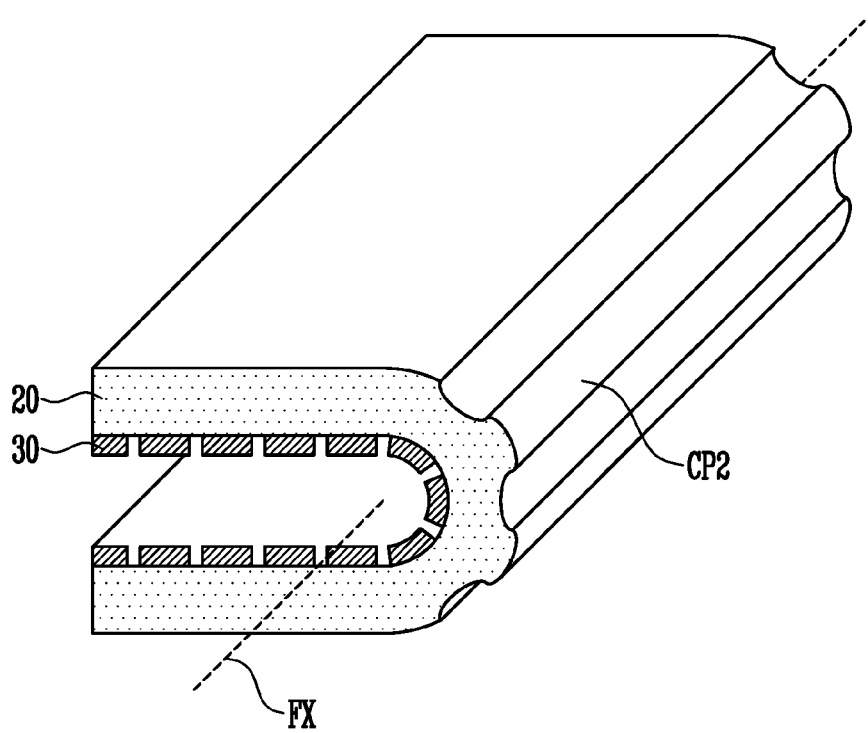
FIG. 2 is a view illustrating a folding axis of the flexible display device.

Referring to FIGS. 1A and 2, a concavo-convex area CA having a first concavo-convex pattern CP1 may be formed in one surface 11 of a carrier substrate 10 in accordance with one exemplary embodiment. The carrier substrate 10 may be a processing substrate for preventing a flexible substrate 20 from being easily bent. The carrier substrate 10 may be formed of a rigid material such as glass or metal and may be removed when the flexible substrate 20 and display elements 30 are formed thereon.

In accordance with one exemplary embodiment, the carrier substrate 10 may serve as a mold for forming a second concavo-convex pattern CP2 of the flexible substrate 20. That is, the structure of the first concavo-convex pattern CP1 of the carrier substrate 10 may be transferred to the flexible substrate 20, to form the second concavo-convex pattern CP2 of the flexible substrate 20.

The concavo-convex area CA of the carrier substrate 10 may be formed corresponding to the area in which the flexible substrate 20 is expected to be frequently folded. In this case, the first concavo-convex pattern CP1 may be formed in a trench line parallel to the folding axis FX of the flexible substrate 20 so that frequent folding actions with the flexible substrate 20 can be easily performed. The cross-section of the first concavo-convex pattern CP1 may be formed in any suitable shape. For instance, the cross-section may be in a curved round shape so that the stress caused by folding actions on the flexible substrate 20 can easily be distributed.

Figure 1B:
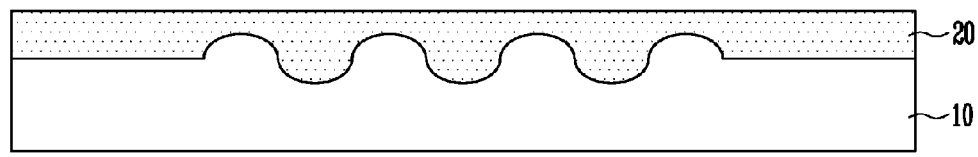

Referring to FIG. 1B, the flexible substrate 20 may be formed on one surface 11 of the carrier substrate 10. The flexible substrate 20 may be formed by any suitable method. In accordance with one exemplary embodiment, the flexible substrate 20 may be formed by coating, on the carrier substrate 10, a liquid resin material, for example, including polyimide (PI), and then curing the coated liquid resin material.

Specifically, the flexible substrate 20 may be formed by forming a polymer material layer on the carrier substrate 10 and then curing the carrier substrate 10 having the polymer material layer formed thereon, using a curing device such as an oven or furnace. Here, the polymer material layer may be formed by coating a polymer material, e.g., PI, on a front surface of the carrier substrate 10. The coating method may be, for example, slit coating, spin coating, or bar coating.

In one exemplary embodiment, the polymer material layer may be cured by placing, in the curing device, the carrier substrate 10 having the polymer material layer formed thereon, and then maintaining the carrier substrate 10, for example, at a temperature of 150 to 300° C. for 20 to 120 minutes.

Here, the polymer material may include one or more polymer compounds that are suitable to be used for a flexible substrate of a display device. For example, of the polymer material may include at least one of polyester or copolymer including the polyester, polyimide (PI) or copolymer including the PI, polyacrylic acid or copolymer including the polyacrylic acid, polystyrene or copolymer including the polystyrene, polysulfate or copolymer including the polysulfate, polyamic acid or copolymer including the polyamic acid, polyamine or copolymer including the polyamine, polyvinylalcohol (PVA), polyallyamine, and polyacrylic acid.

Figure 1C:
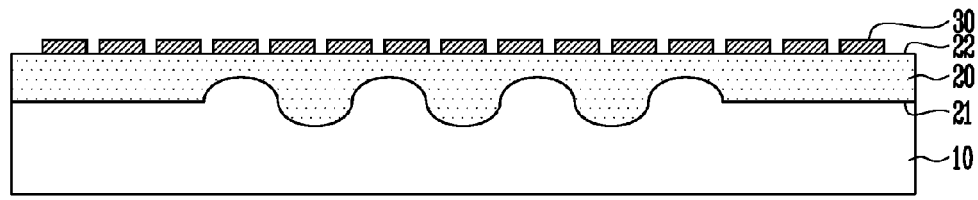

Referring to FIG. 1C, a display element 30 for displaying an image may be formed on the flexible substrate 20. The flexible substrate 20 may include a first surface 21 and a second surface 22 opposite to the first surface 21. The first surface 21 may be a surface in contact with the carrier substrate 10, and the display element 30 may be formed on the second substrate 22.

In one exemplary embodiment, the display element 30 may include an organic light emitting diode OLED.

In one exemplary embodiment, the display element 30 may be a display element employed in a liquid crystal display (LCD) device, an electrophoretic display (EPD) device, and a plasma display panel (PDP).

Components for driving the display element 30 may be further formed on the flexible substrate 20. For example, if the flexible display device is driven by a thin film transistor, gate and data lines for defining each pixel area and a thin film transistor in each pixel area may be formed on the flexible substrate 20.

Figure 1D:
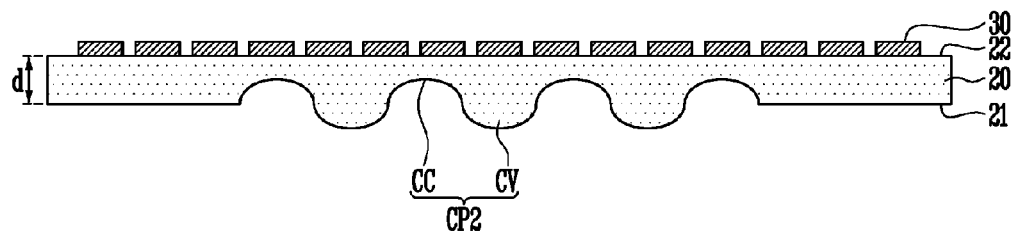

Referring to FIG. 1D, the flexible substrate 20 may be separated from the carrier substrate 10. In accordance with one exemplary embodiment, the carrier substrate 10 which covers the first surface 21 of the flexible substrate 20 may be removed by a separation process while maintaining the second concavo-convex pattern CP2 corresponding to the first concavo-convex pattern CP1 of the carrier substrate 10 on the first surface 21 of the flexible substrate 20.

In accordance with one exemplary embodiment, the structure of the second concavo-convex pattern CP2 may be substantially equal to that of the first concavo-convex pattern CP1. Like the first concavo-convex pattern CP1 described above, the second concavo-convex pattern CP2 may be formed in at least part of an area that is expected to be frequently folded on the first surface 21 of the flexible substrate 20. In addition, the second concavo-convex pattern CP2 may be formed in a trench line parallel to the folding axis FX of the flexible substrate 20 so that the frequent folding actions on the flexible substrate 20 can be easily performed. Further, the cross-section of the second concavo-convex pattern CP2 may be formed in a curved round shape so that the stress caused by the folding actions on the flexible substrate 20 can easily be distributed.

Specifically, the second concavo-convex pattern CP2 may include a concave portion CC and a convex portion CV. In accordance with one exemplary embodiment, the cross-section of the concave portion CC may have a semicircular recessed shape, while the cross-section of the convex portion CV may have a semicircular protruded shape, relative to an imaginary flat reference surface in the middle of the concave portion CC and the convex portion CV. Thus, the thickness d of the flexible substrate 20 is decreased in the concave portion CC of the second concavo-convex pattern CP2, and is increased in the convex portion CV of the second concavo-convex pattern CP2 in accordance with one exemplary embodiment. One of ordinary skill in the art will appreciate that the shapes of the concave portion CC and the convex portion CV, their protrusion and recess depths, their relative area ratio, their period (i.e., the length of one concave portion and one convex portion), and various other design factors can be modified to produce optimal characteristics of the flexible substrate 20.

The flexibility of the flexible substrate 20 tends to be increased in the concave portion CC in which the thickness d of the flexible substrate 20 is decreased, and the rigidity of the flexible substrate 20 tends to be increased in the convex portion CV in which the thickness d of the flexible substrate 20 is increased. Thus, both the flexibility and rigidity of the flexible substrate 20 can be ensured in the area where the second concavo-convex pattern CP2 is formed. Even if the flexible substrate 20 is frequently folded, the flexible substrate 20 is not easily damaged, so that the durability of the product can be improved.

Further, when the second concavo-convex pattern CP2 is formed in the first surface 21 of the flexible substrate 20, there is little to no inconvenience in forming the display element 30, which is formed on the first surface 21.

FIGS. 3A to 3D are cross-sectional views illustrating a manufacturing method of a flexible display device integrated with a touch screen according to one exemplary embodiment of the present invention. FIG. 4 is a partially enlarged view illustrating sensing electrodes of FIG. 3C.

In this embodiment, components identical to those of the aforementioned embodiment are designated by like reference numerals, and their detailed descriptions are not repeated to avoid redundancy.

Figure 3A:
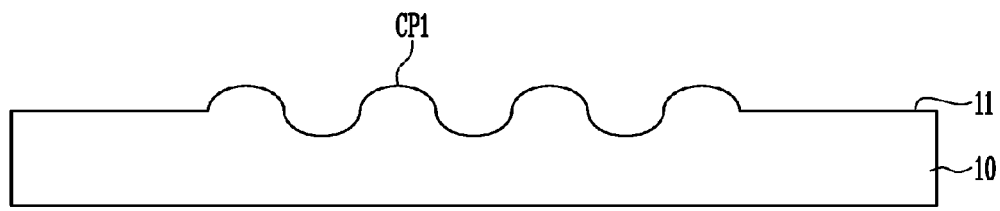
FIGS. 3A, 3B, 3C, and 3D are cross-sectional views illustrating a manufacturing method of a flexible display device integrated with a touch screen according to one exemplary embodiment of the present invention.
Figure 3B:
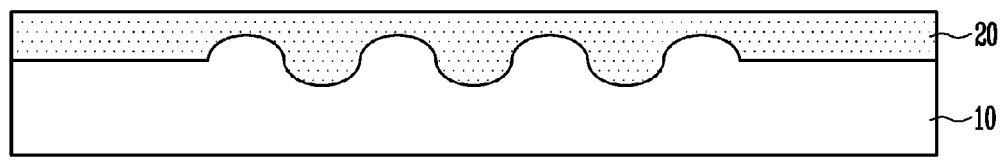

Referring to FIGS. 3A and 3B, a concavo-convex area CA having a first concavo-convex pattern CP1 may be formed on one surface 11 of a carrier substrate 10, and a flexible substrate 20 may be formed on the one surface 11 of the carrier substrate 10. This process of forming the flexible substrate 20 is substantially identical to the descriptions of FIGS. 1A and 1B in the manufacturing method of the flexible display device as described above, and therefore their detailed descriptions are not repeated.

Figure 3C:
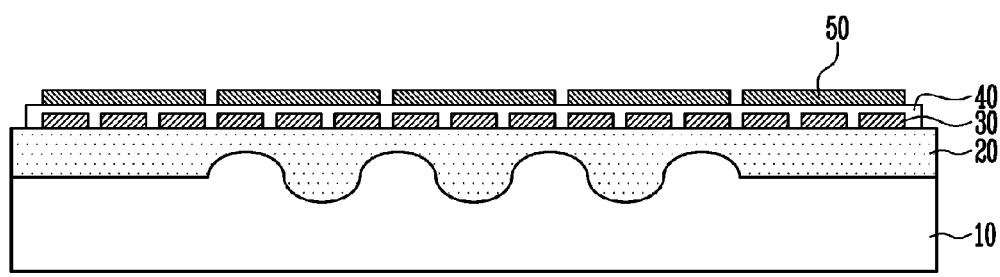

Referring to FIGS. 3C and 4, an insulating layer 40 which covers a display element 30 may be formed on the flexible substrate 20, and sensing electrodes 50 for sensing touch may be formed on the insulating layer 40. In accordance with one exemplary embodiment, the insulating layer 40 may be a transparent film-shaped encapsulation member or encapsulation substrate that can protect the display element 30.

Specifically, the sensing electrodes 50 may include first sensing electrodes 50a arranged along a first direction D1 and second sensing electrodes 50b arranged along a second direction D2 intersecting the first direction D1, when the flexible substrate 20 is presented in a top view. For example, the first sensing electrodes 50a may be aligned in the first direction D1, and the second sensing electrodes 50b may be aligned in the second direction D2, which forms an acute or obtuse angle or right angles with the first direction D1. The sensing electrodes 50 may be formed of a transparent conductive material such as indium tin oxide (ITO) so that light can be transmitted therethrough.

In one exemplary embodiment, adjacent first sensing electrodes 50a may be physically connected through connecting patterns 51, and adjacent second sensing electrodes 50b may be electrically connected through bridge patterns BP. Insulating patterns IP may be interposed in areas where the bridge patterns BP and the connecting patterns 51 are overlapped with each other. Thus, after the sensing electrodes 50 are patterned, there may be added a process of forming the insulating patterns IP on the connecting patterns 51 and forming the bridge patterns BP on the insulating patterns IP.

In one exemplary embodiment, the first sensing electrodes 50a and the second sensing electrodes 50b may be formed on different layers. The material and shape of the sensing electrodes 50 may be variously modified, and the present invention is not limited to what is shown in FIG. 4.

Figure 3D:
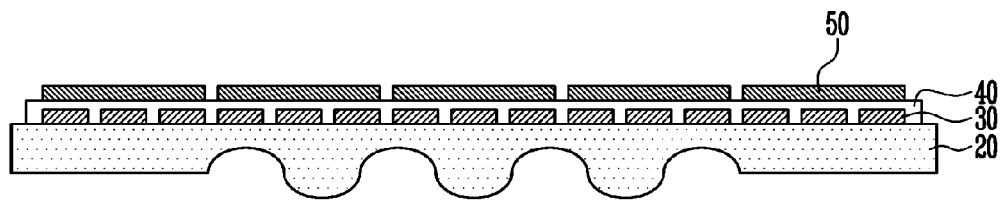

Referring to FIG. 3D, the flexible substrate 20 may be separated from the carrier substrate 10. This separation process and its resulting configurations are substantially identical to the description of FIG. 1D in the manufacturing method of the flexible display device as described above, and therefore their detailed descriptions are not repeated.

The flexible display device in which the display element 30 is formed on the flexible substrate 20, and the sensing electrodes 50 are additionally formed thereon is described in the aforementioned embodiments. However, in a touch screen panel according to another embodiment of the present invention, the sensing electrodes 50, in place of the display element 30, may be directly formed on the flexible substrate 20.

As discussed above, a flexible display device may have a specific area in which the deformation caused by bending actions of the flexible display device repetitively occur. In this case, a crack or damage may occur in the area due to fatigue load.

Therefore, there is a need for a flexible display device and a touch screen panel, which can ensure a rigid characteristic, so that the flexible display device and the touch screen panel are not easily damaged by repetitive bending or deforming actions, yet can maintain a flexible characteristic.

In accordance with various exemplary embodiments of the present disclosure, flexible substrate are manufactured using carrier substrates in which a concavo-convex area is formed corresponding to the area in which the flexible substrates are expected to be frequently folded, so that a characteristic which is sturdy against cracks while maintaining flexibility in the concavo-convex area can be provided to the flexible display device and the touch screen panel.

Further, the concavo-convex pattern is formed in the rear surface of the flexible substrate, so that there is no inconvenience in forming the display element or the sensing electrodes on the front surface of the flexible substrate.

Various exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible display device, comprising:
    a flexible substrate comprising a concavo-convex pattern on a first surface thereof, the concavo-convex pattern extending from a first edge to a second edge of the flexible substrate; and
    a display element configured to display an image on a second surface of the flexible substrate opposite to the first surface.

2. The flexible display device of claim 1, wherein the concavo-convex pattern is disposed corresponding to an area in which the flexible substrate is to be frequently folded.

3. The flexible display device of claim 2, wherein the concavo-convex pattern has a shape of trench line parallel to a folding axis of the flexible substrate.

4. The flexible display device of claim 3, wherein a cross-section of the concavo-convex pattern comprises a curved round shape.

5. The flexible display device of claim 1, wherein a thickness of the flexible substrate is decreased in a concave portion of the concavo-convex pattern, and is increased in a convex portion of the concavo-convex pattern.

6. The flexible display device of claim 1, wherein the concavo-convex pattern comprises concave patterns and convex patterns that alternate with each other.

7. The flexible display device of claim 1, further comprising an insulating layer on the display element.

8. The flexible display device of claim 1, further comprising sensing electrodes configured to sense touch and disposed on the insulating layer.

9. The flexible display device of claim 8, wherein the sensing electrodes comprise first sensing electrodes arranged in a first direction, and second sensing electrodes arranged in a second direction intersecting the first direction.

10. The flexible display device of claim 9, wherein further comprising bridge patterns electrically connecting adjacent second sensing electrodes.

11. A touch screen panel, comprising:
    a flexible substrate comprising a concavo-convex pattern on a first surface thereof, the concavo-convex pattern extending from a first edge to a second edge of the flexible substrate; and
    sensing electrodes configured to sense touch on a second surface of the flexible substrate opposite to the first surface.

12. The touch screen panel of claim 11, wherein the concavo-convex pattern is disposed corresponding to an area in which the flexible substrate is to be frequently folded.

13. The touch screen panel of claim 12, wherein the concavo-convex pattern has a shape of a trench line parallel to a folding axis of the flexible substrate.

14. The touch screen panel of claim 13, wherein a cross-section of the concavo-convex pattern comprises a curved round shape.

15. The touch screen panel of claim 11, wherein a thickness of the flexible substrate is decreased in a concave portion of the concavo-convex pattern, and is increased in a convex portion of the concavo-convex pattern.

16. The touch screen panel of claim 11, wherein the concavo-convex pattern comprises concave patterns and convex patterns that alternate with each other.

17. The touch screen panel of claim 11, wherein the sensing electrodes comprise first sensing electrodes arranged in a first direction, and second sensing electrodes arranged in a second direction intersecting the first direction.

18. The touch screen panel of claim 17, further comprising bridge patterns to electrically connect adjacent second sensing electrodes.

* * * * *